(12) United States Patent
Horner

(10) Patent No.: US 9,168,884 B2
(45) Date of Patent: Oct. 27, 2015

(54) VEHICLE HAVING ACTUATOR FOR DOOR AND METHODS FOR SAME

(71) Applicant: Honda Motor Co., Ltd., Minato-ku, Tokyo (JP)

(72) Inventor: Kurtis Ray Horner, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/834,067

(22) Filed: Mar. 15, 2013

(65) Prior Publication Data

US 2014/0262587 A1 Sep. 18, 2014

(51) Int. Cl.
- *B60R 21/013* (2006.01)
- *E05B 77/12* (2014.01)
- *E05B 77/02* (2014.01)
- *E05B 77/00* (2014.01)

(52) U.S. Cl.
CPC .............. *B60R 21/013* (2013.01); *E05B 77/00* (2013.01); *E05B 77/02* (2013.01); *E05B 77/12* (2013.01)

(58) Field of Classification Search
CPC ......... E05B 77/00; E05B 77/02; E05B 77/04; E05B 77/12; B60R 21/013
USPC ............... 180/271, 274, 281, 282, 286; 49/31
See application file for complete search history.

(56) References Cited

U.S. PATENT DOCUMENTS

| | | | | |
|---|---|---|---|---|
| 3,046,367 A | * | 7/1962 | Hanna | 200/61.78 |
| 3,066,964 A | * | 12/1962 | Lemaire | 292/173 |
| 3,453,015 A | | 7/1969 | Miller | |
| 3,468,392 A | * | 9/1969 | Hass | 180/281 |
| 3,830,332 A | * | 8/1974 | Fontaine | 180/281 |
| 6,241,294 B1 | * | 6/2001 | Young et al. | 292/336.3 |
| 6,317,048 B1 | * | 11/2001 | Bomya et al. | 340/573.1 |
| 7,311,169 B1 | * | 12/2007 | Caliskan et al. | 180/274 |
| 7,735,901 B2 | | 6/2010 | Melz et al. | |
| 7,992,925 B2 | * | 8/2011 | Lagrut | 296/187.09 |
| 8,128,151 B2 | * | 3/2012 | Teramoto et al. | 296/146.1 |
| 8,267,464 B2 | * | 9/2012 | Konchan et al. | 296/146.6 |
| 8,303,022 B2 | * | 11/2012 | Rouhana et al. | 296/146.6 |
| 2004/0059488 A1 | * | 3/2004 | Iida | 701/49 |
| 2005/0274561 A1 | * | 12/2005 | Claar et al. | 180/281 |
| 2006/0033612 A1 | * | 2/2006 | Santa | 340/435 |
| 2009/0119995 A1 | * | 5/2009 | Kucer et al. | 49/31 |
| 2011/0290577 A1 | * | 12/2011 | Abidi | 180/281 |
| 2012/0036785 A1 | * | 2/2012 | Bedekar et al. | 49/394 |
| 2012/0049580 A1 | * | 3/2012 | Konchan et al. | 296/202 |

* cited by examiner

*Primary Examiner* — Faye M Fleming
*Assistant Examiner* — Barry Gooden, Jr.
(74) *Attorney, Agent, or Firm* — Ulmer & Berne LLP

(57) ABSTRACT

A vehicle includes a body, a door, an actuator, and a controller. The body includes an upper portion, a lower portion and a pillar member. The actuator is coupled with the pillar member and includes a movable member that is movable between deployed and retracted positions. The controller is electrically coupled with the actuator and is configured to facilitate movement of the actuator from the retracted position to the deployed position in response to detection of a collision. When the movable member is in the deployed position with the door closed, the movable member is in an abutting relationship with the door. When the movable member is in the retracted position, the movable member is spaced from the door.

23 Claims, 7 Drawing Sheets

VEHICLE HAVING ACTUATOR FOR DOOR AND METHODS FOR SAME

TECHNICAL FIELD

A vehicle includes an actuator having a movable member that is movable between a deployed position and a retracted position. When in the deployed position, the movable member is in an abutting relationship with a door of the vehicle.

BACKGROUND

Some conventional vehicles include doors that can be secured in a closed position when the vehicle is involved in a collision.

SUMMARY

In accordance with one embodiment, a vehicle comprises a body, a door, an actuator, and a controller. The body comprises an upper portion, a lower portion and a pillar member. The pillar member extends to each of the upper portion and the lower portion. The upper portion, the lower portion and the pillar member cooperate to at least partially define a door opening. The door is pivotally coupled with the body adjacent to the door opening. The actuator is coupled with the pillar member and comprises a movable member that is movable between a deployed position and a retracted position. The controller is electrically coupled with the actuator and is configured to facilitate movement of the actuator from the retracted position to the deployed position in response to detection of a collision. When the movable member is in the deployed position with the door closed, the movable member is in an abutting relationship with the door. When the movable member is in the retracted position, the movable member is spaced from the door.

In accordance with another embodiment, a vehicle comprises a body, a door, and a supplemental restraint system. The body at least partially defines a passenger compartment and comprises an upper portion, a lower portion, and a pillar member that extends to each of the upper portion and the lower portion. The upper portion, the lower portion, and the pillar member cooperate to at least partially define a door opening. The door is pivotally coupled with the body adjacent to the door opening. The supplemental restraint system comprises a plurality of airbags, an actuator, a collision sensor, and a supplemental restraint system controller. The plurality of airbags is disposed within the passenger compartment. The actuator is coupled with the pillar member. The actuator comprises a movable member that is movable between a deployed position and a retracted position. The collision sensor is configured to generate a collision signal in response to a collision. The supplemental restraint system controller is electrically coupled with the plurality of airbags, the actuator, and the collision sensor. The supplemental restraint system controller is configured to facilitate deployment of the airbags and movement of the movable member into the deployed position substantially simultaneously and in response to receipt of the collision signal from the collision sensor. When the movable member is in the deployed position with the door closed, the movable member is in an abutting relationship with the door. When the movable member is in the retracted position, the movable member is spaced from the door.

In accordance with yet another embodiment, a method for operating a supplemental restraint system of a vehicle is provided. The method comprises detecting a collision and, in response to detection of a collision, deploying a movable member of an actuator into an abutting relationship with a door of the vehicle.

BRIEF DESCRIPTION OF THE DRAWINGS

It is believed that certain embodiments will be better understood from the following description taken in conjunction with the accompanying drawings in which.

DETAILED DESCRIPTION

Figure 1:
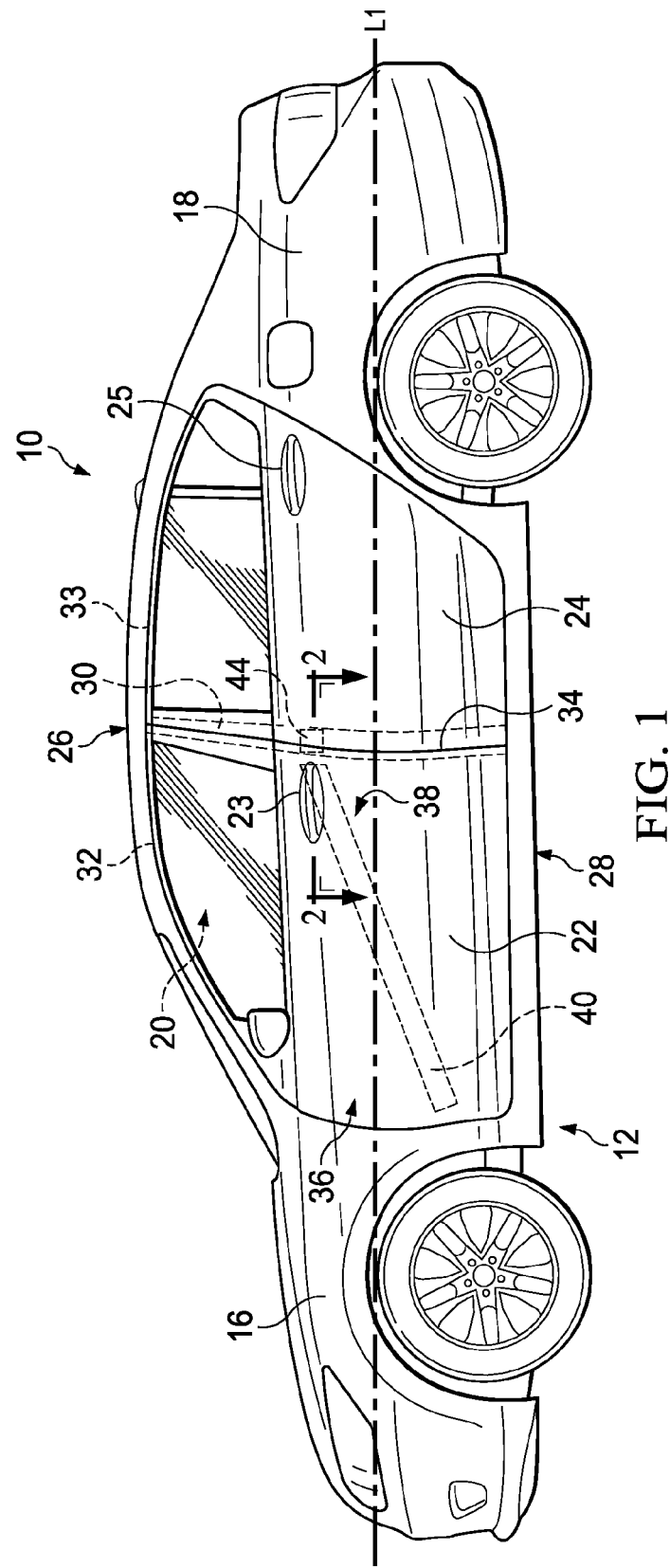
FIG. 1 is a side elevational view of a vehicle that includes a front door, an actuator, and a reinforcement beam, according to one embodiment, wherein certain hidden components are shown in dashed lines.

In connection with the views and examples of FIGS. 1-8, wherein like numbers indicate the same or corresponding elements throughout the views, FIG. 1 illustrates a vehicle 10. The vehicle 10 is shown in FIG. 1 to comprise an automobile. However, a vehicle in accordance with alternative embodiments can comprise a sport-utility vehicle ("SUV"), a truck, a van, or a cross-over type vehicle ("CUV"), for example. As illustrated in FIG. 1, the vehicle 10 can include a body 12. In one embodiment, the body 12 can be provided as a unibody construction, but in other embodiments, a body can be provided in any of a variety of other suitable arrangements, such as a body-in-white structure or an arrangement having an underlying frame formed as a tubular construction, for example, and can be formed using any of a variety of materials, such as steel, aluminum, or carbon fiber, for example. The body 12 can include a variety of body panels such as a front fender panel 16 and a rear fender panel 18. The body 12 can define a passenger compartment 20. The vehicle 10 can include a pair of front doors (e.g., 22) and a pair of rear doors (e.g., 24) that are each pivotally coupled with the body 12 and facilitate ingress/egress of passengers into/from the passenger compartment 20. The front and rear doors (e.g., 22, 24) can include respective front and rear door handles (e.g., 23, 25) that can each be selectively actuated to release respective ones of the front and rear doors (e.g., 22, 24) from their closed positions. Although the vehicle 10 is shown to be a four-door vehicle, it will be appreciated that the present disclosure also contemplates a two-door vehicular arrangement (e.g., a coupe) while keeping within the scope and spirit of the present disclosure.

As illustrated in FIG. 1, the body 12 can include an upper portion 26, a lower portion 28, and a pillar member 30 that extends between the upper portion 26 and the lower portion 28. In one embodiment, the pillar member 30 can be formed as a tubular construction and coupled to the upper and lower portions 26, 28 of the body 12 through stamping, welding, brazing, integral forming, or any of a variety of other suitable attachment methods. The upper portion 26, the lower portion 28, and the pillar member 30 can cooperate to at least partially define respective door openings 32, 33 for the front and rear doors (e.g., 22, 24). The front and rear doors (e.g., 22, 24) can be pivotally coupled with the body 12 adjacent the respective door openings 32, 33 for selectively and alternatively blocking and facilitating access to the passenger compartment 20 through the door openings 32, 33. The pillar member 30 is shown to be substantially upright and contoured to substantially correspond with a seam 34 defined between the front and rear doors (e.g., 22, 24). Weather stripping (not shown) can be routed along each of the front and rear doors (e.g., 22, 24) and can interact with the pillar member 30 to provide an effective seal between the front and rear doors (e.g., 22, 24) and the pillar member 30.

Figure 2:
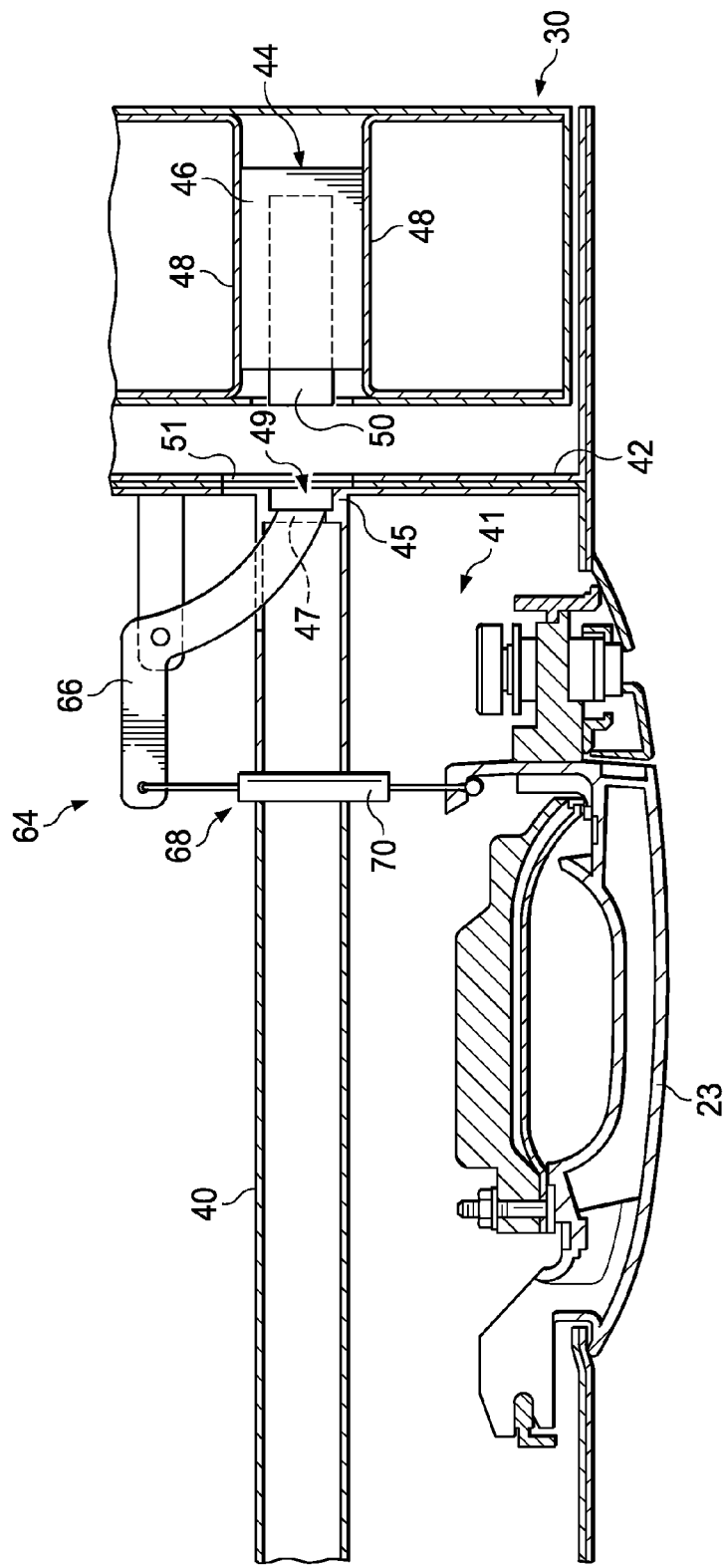
FIG. 2 is a partial cross-sectional view of the vehicle of FIG. 1 taken along line 2-2 in FIG. 1, wherein a pin of the actuator is shown in a retracted position.
Figure 3:
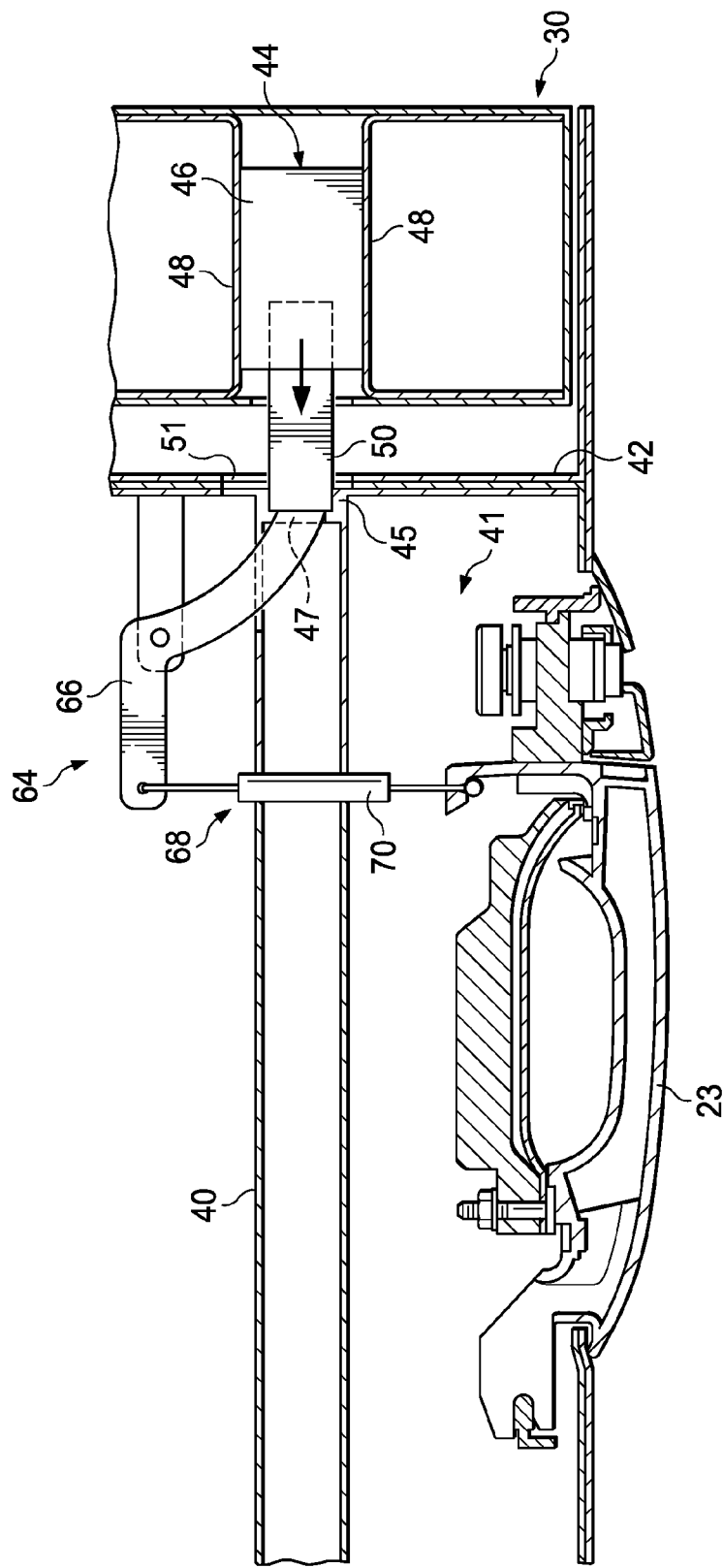
FIG. 3 is a partial cross-sectional view similar to FIG. 2, but with the pin of the actuator shown in a deployed position.

As illustrated in FIG. 1, the front door 22 can comprise a front portion 36, a rear portion 38, and a reinforcing member, such as a reinforcing beam 40. As illustrated in FIGS. 2-3, the reinforcing beam 40 can be disposed within an interior 41 of the front door 22 and can extend laterally (e.g., along the longitudinal centerline L1 of the vehicle 10) to areas adjacent to the front and rear portions 36, 38 of the front door 22. Although the reinforcing beam 40 is shown to extend upwardly from the front portion 36 to the rear portion 38 of the door. It will be appreciated that a reinforcement member can be provided in any of a variety of suitable alternative arrangements such as substantially parallel with the longitudinal centerline L1). The reinforcing beam 40 can be secured to a door frame 42 of the front door 22 such as through welding or forming together as a one-piece construction, for example. The reinforcing beam 40 can provide structural rigidity to the front door 22 and can resist deformation of the front door 22 during a collision, such as during a side-impact collision, for example.

The vehicle 10 can include an actuator coupled with the pillar member 30. The actuator can comprise a movable member that is movable between a deployed position and a retracted position. In one embodiment, as illustrated in FIGS. 1-3, the actuator can comprise a linear actuator 44 having a base 46 that is secured to interior side walls 48 of the pillar member 30 such as through welding, with fasteners (not shown), or in any of a variety of suitable alternative arrangements. The linear actuator 44 can include a pin 50 that is slidably coupled with the base 46 and is slidable between the retracted position (FIG. 2) and the deployed position (FIG. 3). When the pin 50 is in the retracted position, as shown in FIG. 2, the pin 50 can be spaced from the reinforcing beam 40 and the door frame 42 such that the front door 22 is permitted to be opened and closed. When the pin 50 is in the deployed position, as shown in FIG. 3, the pin 50 can be in an abutting relationship with the reinforcing beam 40.

The reinforcing beam 40 is shown to include a shoulder member 45 and an interior wall 47 that cooperate to define a recess 49. When the pin 50 is in the deployed position a portion of the pin 50 can be received within the recess 49 such that the pin 50 contacts the shoulder member 45 and is in an abutting relationship with the interior wall 47. With the pin 50 in such an abutting relationship with the reinforcing beam 40, the pin 50 and the reinforcing beam 40 can cooperate to provide a collision load path from the front fender panel 16 through the front door 22 and to the pillar member 30 (e.g., substantially along the longitudinal centerline L1 of the vehicle 10). As a result, when the vehicle 10 is involved in a collision, some of the collision energy at a front of the vehicle 10 can be effectively routed through the front door 22 and away from the passenger compartment 20. As illustrated in FIG. 3, when the pin 50 is in the deployed position, the shoulder member 45 of the reinforcing beam 40 can extend over a portion of the pin 50 such that the reinforcing beam 40 overlaps a portion of the pin 50 in a longitudinal direction. As such, when the vehicle 10 is involved in a side collision, the reinforcing beam 40 and the pin 50 can be effectively linked together to facilitate routing of some of the collision energy from the side collision to the pillar member 30 and away from the passenger compartment 20.

Referring now to FIG. 3, when the pin 50 is in the deployed position, the pin 50 is shown to directly contact the reinforcement beam 40 through an aperture 51 in the door frame 42. It will be appreciated, however, that a pin or other movable member of an actuator can be provided in any of a variety of other suitable direct or indirect abutting relationships with a reinforcement beam. For example, in one embodiment, a door frame can be configured such that it is interposed between a reinforcing member and a pin. In such an embodiment, when the pin contacts the door frame, collision energy can be transmitted from the reinforcing member to the pin through the door frame. In another embodiment, the pin and the reinforcing member can be arranged such that the pin and the reinforcing member overlap one another in the longitudinal direction (e.g., substantially parallel with the longitudinal centerline L1) when the pin contacts the door frame.

Figure 4:
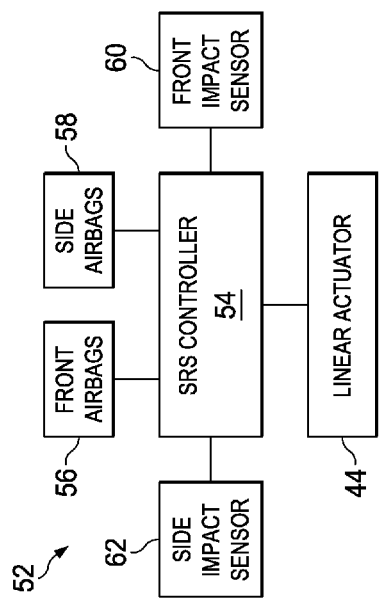
FIG. 4 is a block diagram depicting a supplemental restraint system of the vehicle of FIG. 1.
Figure 5:
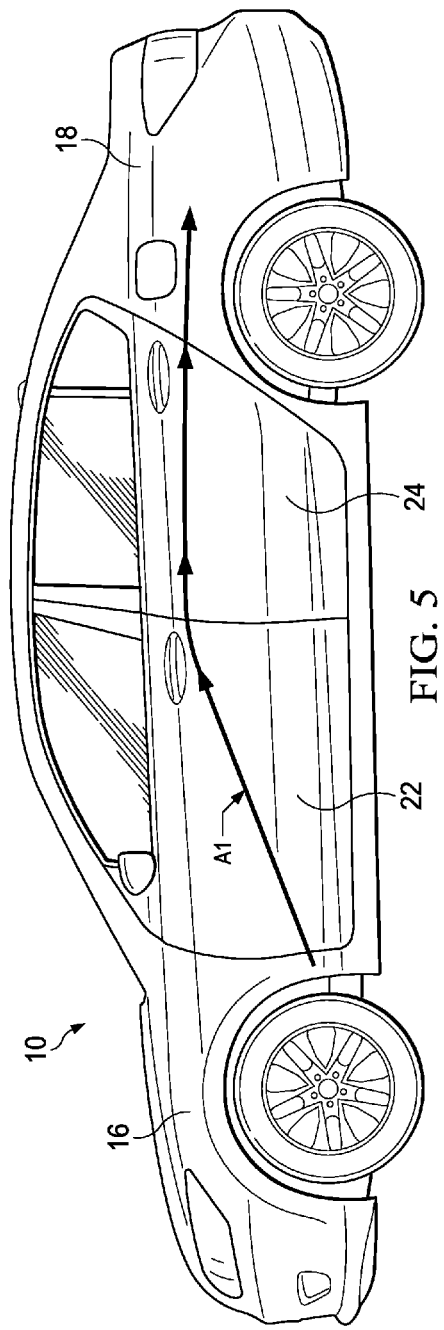
FIG. 5 is a side elevational view of the vehicle of FIG. 1, wherein a transmission path of collision energy is shown.

The linear actuator 44 can be configured for selective deployment (e.g., movement from the retracted position into the deployed position) in response to detection of a collision. As illustrated in FIG. 4, the linear actuator 44 can be included as part of a supplemental restraint system (SRS) 52. The SRS 52 can include an SRS controller 54 that is electrically coupled with the linear actuator 44, front airbags 56, side airbags 58, a front impact sensor 60, and a side impact sensor 62. The front and side airbags 56, 58 can be disposed within the passenger compartment 20. The front impact sensor 60 and the side impact sensor 62 can facilitate detection of a front and side impact with the vehicle 10, respectively. When the vehicle 10 is involved in a collision, the front impact sensor 60 and the side impact sensor 62 can selectively generate respective collision signals for the SRS controller 54. When the SRS controller 54 receives the collision signal(s), the SRS controller 54 can facilitate deployment of the front airbags 56 and/or the side airbags 58. In some embodiments, the SRS controller 54 can tailor the deployment of the front airbags 56, the side airbags 58, and/or other SRS devices to accommodate for the particular collision detected by the SRS controller 54. It will be appreciated that, although the SRS 52 is described above with respect to individual front and side airbags and individual front and side impact sensors, any of a variety of different airbag and impact sensor combinations can alternatively or additionally be provided.

The SRS controller 54 can be configured to deploy the pin 50 of the linear actuator 44 in response to a collision. As described above with reference to FIG. 3, with the pin 50 deployed and in an abutting relationship with the reinforcement beam 40, at least some of the energy from a collision can be transmitted through the front door 22 and thus away from the passenger compartment 20. In one embodiment, the pin 50 can be deployed substantially simultaneously together with other SRS devices (e.g., the front airbags 56 and/or the side airbags 58). In other embodiments, the pin 50 can be deployed independently of other SRS devices.

It will be appreciated that although the linear actuator 44 is shown to be associated with a B-pillar for a left front door (i.e., 30), a linear actuator can be associated with a front door of a vehicle in any of a variety of other suitable configurations. Linear actuators can additionally or alternatively be associated with one or more other doors on a vehicle (e.g., rear door 24). The linear actuators at each of the front and rear doors (e.g., 22, 24) can be similar, or the same in many respects, as the linear actuator 44. As a result, when the vehicle 10 is involved in a collision, all of the linear actuators can be deployed to create a collision path along the left and right sides of the vehicle 10 from the front fender panel (e.g., 16) through the front and rear doors (e.g., 22, 24) and to the rear fender panel (e.g., 18). The collision energy generated during the collision can therefore be effectively transmitted around the passenger compartment 20 (through the front and rear doors and the pillar members) and to a rear of the vehicle 10 (e.g., to the rear fender panel 18), as illustrated by the transmission path A1 of FIG. 5.

Figure 6:
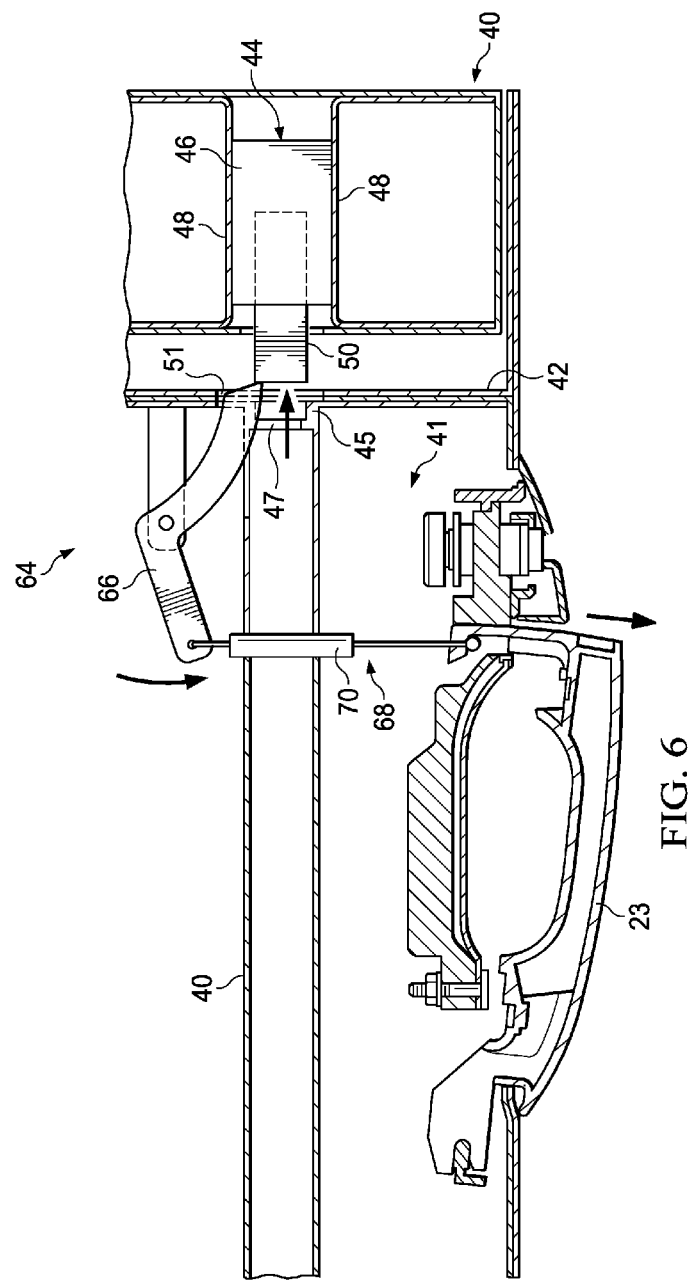
FIG. 6 is a partial cross-sectional view similar to FIG. 2 but with a door handle shown in an actuated position to urge the pin of the actuator away from a deployed position.

With the pin 50 deployed, the pin 50 can prevent the front door 22 from being opened. As illustrated in FIG. 6, the vehicle 10 can include a release mechanism 64 that is operably coupled with a front door handle 23 and can facilitate movement of the pin 50 into the retracted position when the front door handle 23 is actuated. The release mechanism 64 can include a pivot member 66 that is pivotal relative to the reinforcement beam 40 and is pivotable between a deactivated position (FIGS. 2 and 3) and an activated position (FIG. 6). The pivot member 66 can be operably coupled with the front door handle 23 by a cable 68. As illustrated in FIGS. 2-3 and 6, the cable 68 can comprise a Bowden-type cable having an outer sheath 70 that is coupled with and/or passes through the reinforcement beam 40. However, in other embodiments, any of a variety of cables or other types of coupling arrangements can be provided.

When the pin 50 is deployed and the front door handle 23 is subsequently actuated to open the front door 22, the front door handle 23 can actuate the pivot member 66, as shown in FIG. 6. The pivot member 66 can contact the pin 50 and can urge the pin 50 away from the deployed position. Once the pivot member 66 has moved the pin 50 away from the door frame 42 enough, the front door 22 can be pulled opened. The pivot member 66 is shown in FIGS. 2-3 and 6 to overlie the reinforcement beam 40. It will be appreciated that, in such an embodiment, the pin 50 of the linear actuator 44 can be configured such that a portion of the pin 50 extends above the reinforcing beam 40 enough to facilitate engagement with the pivot member 66.

As illustrated in FIG. 3, when the pin 50 of the linear actuator 44 is deployed, the pin 50 can extend far enough into the door frame 42 to prevent the front door 22 from opening. When the front door handle 23 is actuated to open the front door 22, as shown in FIG. 6, the pivot member 66 can pivot and can urge the pin 50 away from the deployed position towards the retracted position. Once the pivot member 66 has pivoted enough to push the pin 50 away from the door frame 42, the front door 22 is free to be opened.

Figure 7:
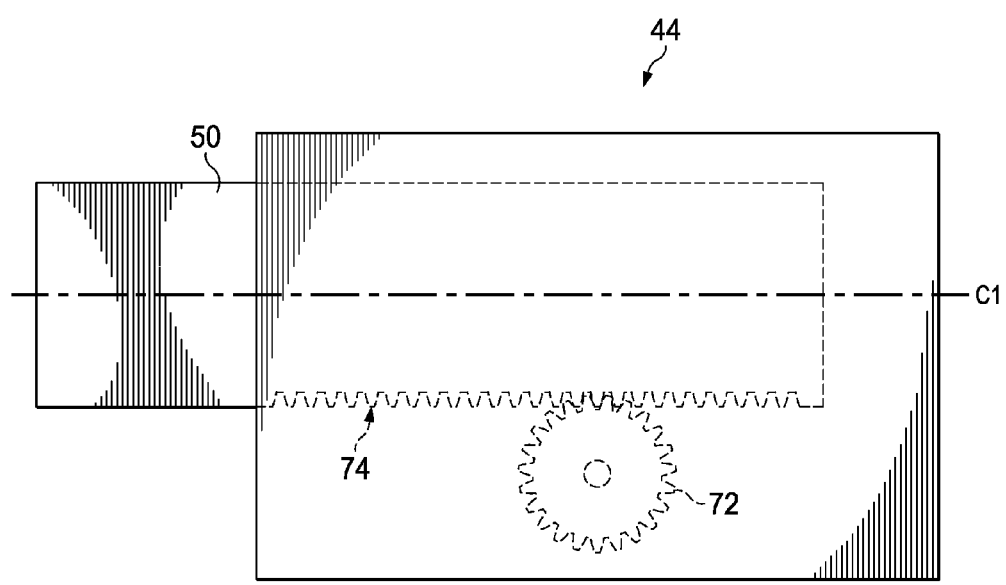
FIG. 7 is a side view of the actuator of FIG. 1 removed from the vehicle, according to one embodiment.

The linear actuator 44 is shown in FIG. 7 to include a gear 72 that is intermeshed with a geared surface 74 of the pin 50, such that rotation of the gear 72 can facilitate linear movement of the pin 50. In one embodiment, the gear 72 can be drivingly coupled with a motor (not shown) and can comprise a one-way gear that is configured to facilitate deployment of the pin 50 under power from the motor. In such an embodiment, once the pin 50 has been deployed (e.g., through power of the motor, as actuated by the SRS controller 54), the pin 50 can be returned to the retracted position by the release mechanism 64 or any of a variety of suitable alternative arrangements (e.g., pyrotechnics). In another embodiment, the gear 72 can comprise a bidirectional gear that is configured to facilitate bidirectional movement of the pin 50 between the deployed position and the retracted position. In such an embodiment, when a collision occurs, the SRS controller 54 can actuate the gear 72 (e.g., with a motor) to facilitate deployment of the pin 50. After the collision, the SRS controller 54 can actuate the gear 72 (e.g., with a motor), such as when the front door handle (e.g., 23) is actuated to open the front door (e.g., 22), to facilitate retraction of the pin 50. The pin 50 is shown to define an imaginary centerline C1. In one embodiment, the linear actuator 44 can be arranged such that that imaginary centerline C1 is substantially parallel with the longitudinal centerline L1 of the vehicle 10. It will be appreciated that an actuator and a movable member can be provided in any of a variety suitable alternative arrangements, such as a solenoid having a movable pin, a rack and pinion arrangement, or a pyrotechnic actuator, for example.

Figure 8:
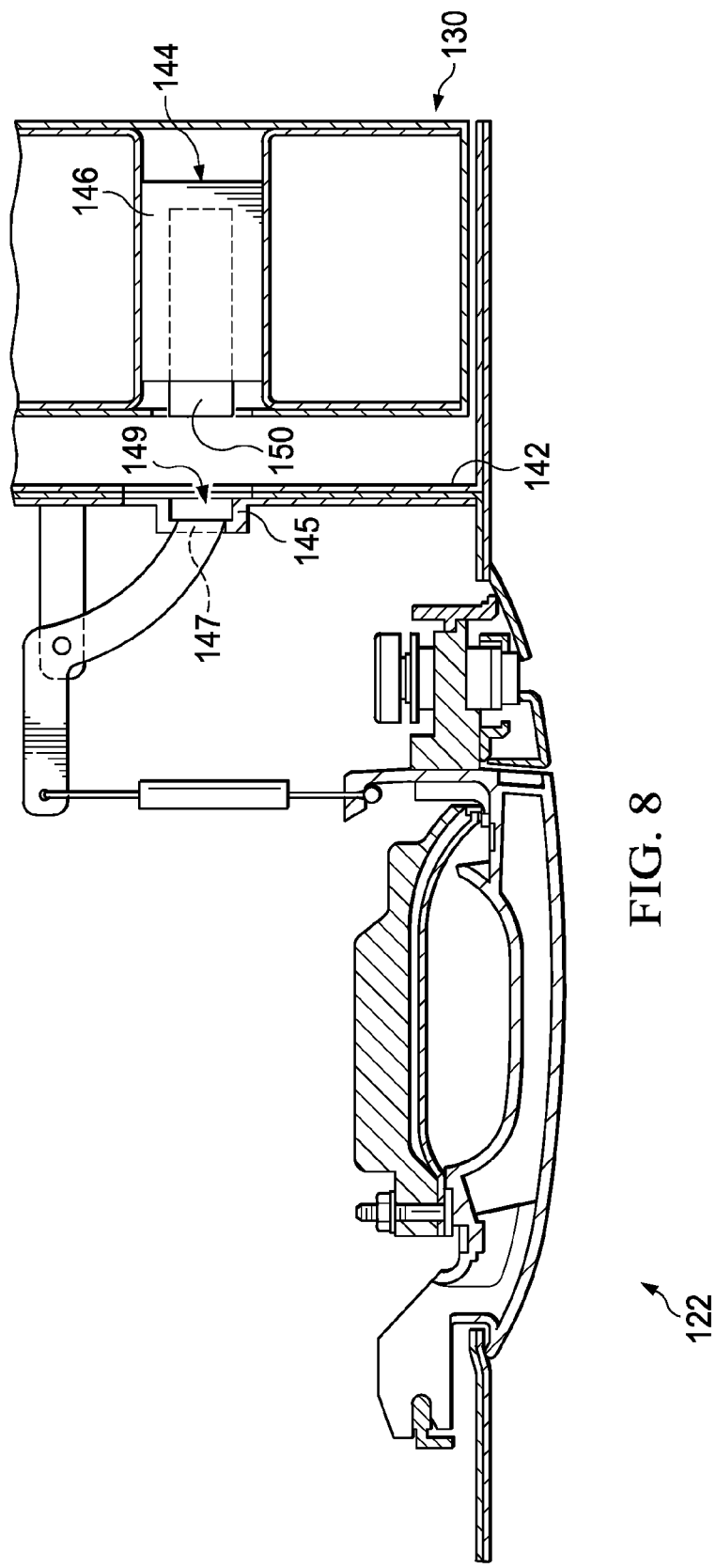
FIG. 8 is a partial cross-sectional view of a door of a vehicle according to another embodiment, wherein a pin of an actuator is shown in a retracted position.

Referring now to FIG. 8, a front door 122 and a linear actuator 144 are illustrated according to another embodiment. The front door 122 and the linear actuator 144 can be similar to, or the same in many respects to the front door 122 and the linear actuator 144, shown in FIGS. 1-7. For example, the front door 122 can include a door frame 142. The linear actuator 144 can be coupled to a pillar 130 adjacent to the door frame 142. The linear actuator 144 can include a pin 150 that is movable with respect to a base 146. The front door 122, however, might not include a reinforcing member (e.g., 40), but instead can have sufficient rigidity built into the door frame 142. In this arrangement, the door frame 142 can include a shoulder member 145 and an interior wall 147 that cooperate to define a recess 149. In such an arrangement, when the pin 150 is in the deployed position with the front door 122 closed, the pin can be in an abutting relationship with the front door 122. More particularly, when the pin 150 is in the deployed position, as illustrated in FIG. 8, a portion of the pin 150 can be received within the recess 149 such that it contacts the shoulder member 145 and is in an abutting relationship with the interior wall 147 of the door frame 142. With the pin 150 in such an abutting relationship with the door frame 142, the pin 150 and the door frame 142 can cooperate to provide a collision load path through the front door to the pillar member 130. The pin 150 and the door frame 142 can also be linked to facilitate routing of side collision energy to the pillar member 130 and away from the passenger compartment (e.g., 20).

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:
1. A vehicle comprising:
   a body comprising an upper portion, a lower portion, and a pillar member, the pillar member extending to each of the upper portion and the lower portion, and the upper portion, the lower portion, and the pillar member cooperating to at least partially define a door opening;

a door pivotally coupled with the body adjacent to the door opening;

an actuator coupled with the pillar member and comprising a movable member that is movable between a deployed position and a retracted position along a path of travel, the movable member having a centerline that is parallel with the path of travel and comprising a striking surface that is intersected by the centerline; and a controller electrically coupled with the actuator and configured to facilitate movement of the movable member from the retracted position to the deployed position in response to detection of a collision; wherein:

when the movable member is in the deployed position with the door closed, the striking surface of the movable member contacts the door at a location that is intersected by the centerline of the movable member such that the movable member cooperates with the door to provide a collision load path through the door substantially along a longitudinal centerline of the vehicle;

once the movable member contacts the striking surface of the door, the movable member is prevented from further movement away from the retracted position;

the movable member is fully extended when in the deployed position; and when the movable member is in the retracted position, the movable member is spaced from the door.

2. The vehicle of claim 1 wherein the door defines an interior and the movable member remains external from the interior when the movable member is in contact with the door in the deployed position.

3. The vehicle of claim 1 wherein the door further comprises a front portion, a rear portion, and a reinforcing member that extends to each of the front portion and the rear portion, wherein when the movable member is in the deployed position with the door closed, the movable member contacts the reinforcing member, and when the movable member is in the retracted position, the movable member is spaced from the reinforcing member.

4. The vehicle of claim 3 wherein the reinforcing member comprises a shoulder member and an interior wall that cooperate to define a recess, and wherein when the movable member is in the deployed position: 1) a portion of the movable member is received within the recess such that the movable member contacts the shoulder member, 2) the striking surface of the movable member contacts the interior wall, and 3) the shoulder portion extends over a portion of the movable member.

5. The vehicle of claim 1 wherein the actuator comprises a linear actuator and the movable member comprises a pin that is movable between the deployed position and the retracted position.

6. The vehicle of claim 5 wherein the linear actuator further comprises a gear that is intermeshed with the pin and configured to facilitate movement of the pin between the deployed position and the retracted position.

7. The vehicle of claim 1 wherein the controller comprises a supplemental restraint system controller.

8. The vehicle of claim 7 further comprising a plurality of airbags in electrical communication with the supplemental restraint system controller, the supplemental restraint system controller being configured to facilitate deployment of the plurality of airbags and movement of the actuator into the deployed position substantially simultaneously and in response to detection of a collision.

9. The vehicle of claim 1 further comprising:
a door handle; and a release mechanism that is operably coupled with the door handle and configured to urge the movable member away from the deployed position in response to actuation of the door handle.

10. The vehicle of claim 9 wherein the release mechanism comprises a pivot member and a cable, and wherein the pivot member is pivotable relative to the door and is operably coupled with the door handle by the cable.

11. The vehicle of claim 9 wherein the release mechanism is configured to selectively urge the movable member away from the deployed position enough to permit opening of the door.

12. A vehicle comprising:
a body at least partially defining a passenger compartment and comprising an upper portion, a lower portion, and a pillar member that extends to each of the upper portion and the lower portion, wherein the upper portion, the lower portion, and the pillar member cooperate to at least partially define a door opening;

a door pivotally coupled with the body adjacent to the door opening; and a supplemental restraint system comprising:
a plurality of airbags disposed within the passenger compartment;

an actuator coupled with the pillar member and comprising a movable member that is movable between a deployed position and a retracted position along a path of travel, the movable member having a centerline that is parallel with the path of travel and comprising a striking surface that is intersected by the centerline;

a collision sensor configured to generate a collision signal in response to a collision; and a supplemental restraint system controller electrically coupled with the plurality of airbags, the actuator, and the collision sensor; wherein:

the supplemental restraint system controller is configured to facilitate deployment of the plurality of airbags and movement of the movable member into the deployed position substantially simultaneously and in response to receipt of the collision signal from the collision sensor;

when the movable member is in the deployed position with the door closed, the striking surface of the movable member contacts the door at a location that is intersected by the centerline of the movable member such that the movable member cooperates with the door to provide a collision load path through the door substantially along a longitudinal centerline of the vehicle;

once the movable member contacts the striking surface of the door, the movable member is prevented from further movement away from the retracted position;

the movable member is fully extended when in the deployed position; and when the movable member is in the retracted position, the movable member is spaced from the door.

13. The vehicle of claim 12 wherein the door comprises a door frame that comprises a shoulder member and an interior wall that cooperate to define a recess, and wherein when the movable member is in the deployed position: 1) a portion of the movable member is received within the recess such that the movable member contacts the shoulder member, 2) the striking surface of the movable member contacts the interior wall, and 3) the shoulder portion extends over a portion of the movable member.

14. The vehicle of claim 12 wherein the door further comprises a front portion, a rear portion, and a reinforcing member that extends to each of the front portion and the rear portion, wherein when the movable member is in the deployed position with the door closed, the striking surface of the movable member contacts the reinforcing member, and when the movable member is in the retracted position, the movable member is spaced from the reinforcing member.

15. The vehicle of claim 12 wherein at least one of the plurality of airbags comprises a side airbag and the collision sensor comprises a side impact sensor such that the supplemental restraint system controller deploys the side airbag and moves the movable member into the deployed position substantially simultaneously with the side airbag in response to receipt of a side collision signal from the side impact sensor.

16. The vehicle of claim 12 wherein at least one of the plurality of airbags comprises a front airbag and the collision sensor comprises a front impact sensor such that the supplemental restraint system controller deploys the front airbag and moves the movable member into the deployed position substantially simultaneously with the front airbag in response to receipt of a front collision signal from the front impact sensor.

17. The vehicle of claim 12 wherein the door further comprises:
   a door handle; and
   a release mechanism that is operably coupled with the door handle and configured to urge the pin away from the deployed position in response to actuation of the door handle for opening of the door.

18. The vehicle of claim 12 wherein the door defines an interior and the movable member remains external from the interior when the movable member is in contact with the door in the deployed position.

19. The vehicle of claim 12 wherein the actuator comprises a linear actuator and the movable member comprises a pin that is movable between the deployed position and the retracted position.

20. The vehicle of claim 19 wherein the actuator further comprises a gear that is intermeshed with the pin and configured to facilitate movement of the pin between the deployed position and the retracted position.

21. A method for operating a supplemental restraint system of a vehicle, the method comprising:
   detecting a collision;
   in response to the detection of a collision, deploying a movable member of an actuator along a path of travel, the movable member having a centerline that is parallel with the path of travel and comprising a striking surface that is intersected by the centerline; and
   contacting a door of the vehicle with the striking surface of the movable member at a location that is intersected by the centerline of the movable member such that the movable member cooperates with the door to provide a collision load path through the door substantially along a longitudinal centerline of the vehicle;
   wherein the movable member is fully extended when deployed; and
   wherein once the movable member contacts the striking surface of the door, the movable member is prevented from further movement away from the retracted position.

22. The method of claim 21 further comprising, after a collision, retracting the movable member to permit opening of the door.

23. The method of claim 21 wherein the door defines an interior and the movable member remains external from the interior when the movable member is in contact with the door in the deployed position.

\* \* \* \* \*